(12) United States Patent
Lutkus et al.

(10) Patent No.: US 6,494,659 B1
(45) Date of Patent: Dec. 17, 2002

(54) ANTI-GALLING FASTENER INSERTS

(75) Inventors: William J. Lutkus, Watertown; William Giannakakos, Danbury; Ronald J. Phillips, Simsbury, all of CT (US)

(73) Assignee: Emhart LLC, Newark, DE (US)

( * ) Notice: Subject to any disclaimer, the term of this patent is extended or adjusted under 35 U.S.C. 154(b) by 0 days.

(21) Appl. No.: 09/498,821

(22) Filed: Feb. 4, 2000

(51) Int. Cl.⁷ .................................................. F16B 3/12
(52) U.S. Cl. ...................................................... 411/438
(58) Field of Search ................................. 411/178, 438, 411/16

(56) References Cited

U.S. PATENT DOCUMENTS

| | | | |
|---|---|---|---|
| 2,607,259 A | * | 8/1952 | Foster ........................ 411/438 |
| 3,912,503 A | | 10/1975 | Schumacher et al. |
| 4,563,119 A | * | 1/1986 | Cosenza ...................... 411/438 |
| 4,814,140 A | | 3/1989 | Magee, Jr. |
| 5,254,184 A | | 10/1993 | Magee, Jr. et al. |
| 5,860,779 A | * | 1/1999 | Toosky ........................ 411/178 |

FOREIGN PATENT DOCUMENTS

DE          833573    *    3/1952    ................. 411/438

* cited by examiner

Primary Examiner—Flemming Saether
(74) Attorney, Agent, or Firm—Edward D. Murphy

(57) ABSTRACT

Described herein is a nitrogn strengthened stainless steel fastener insert and nut assembly which is resistant to galling when used in a fastener assembly. In addition to reduced galling, the fastener insert exhibits good corrosion resistance and a yield strength which is almost twice that of fasteners formed from 304 type stainless steel.

10 Claims, 2 Drawing Sheets

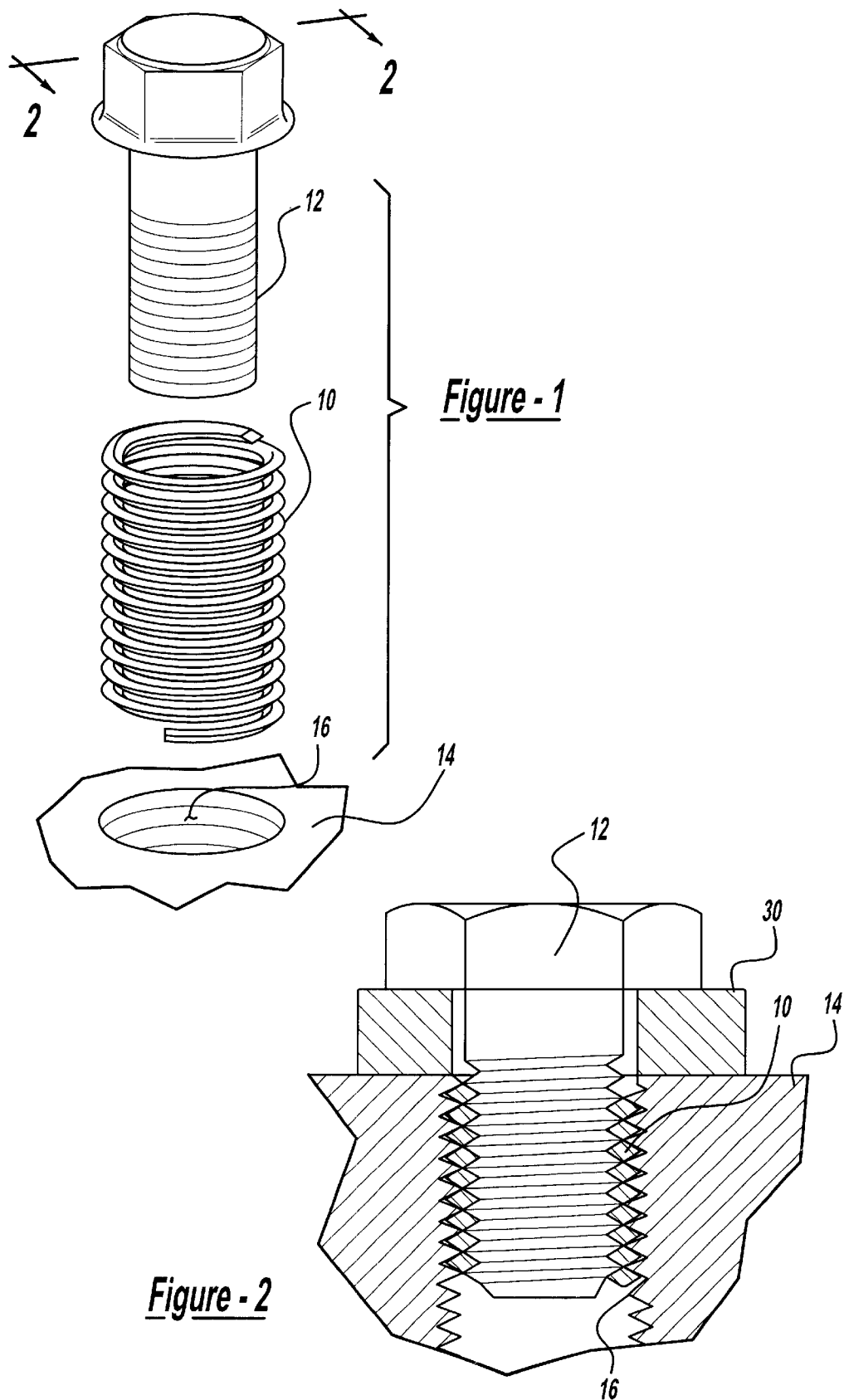

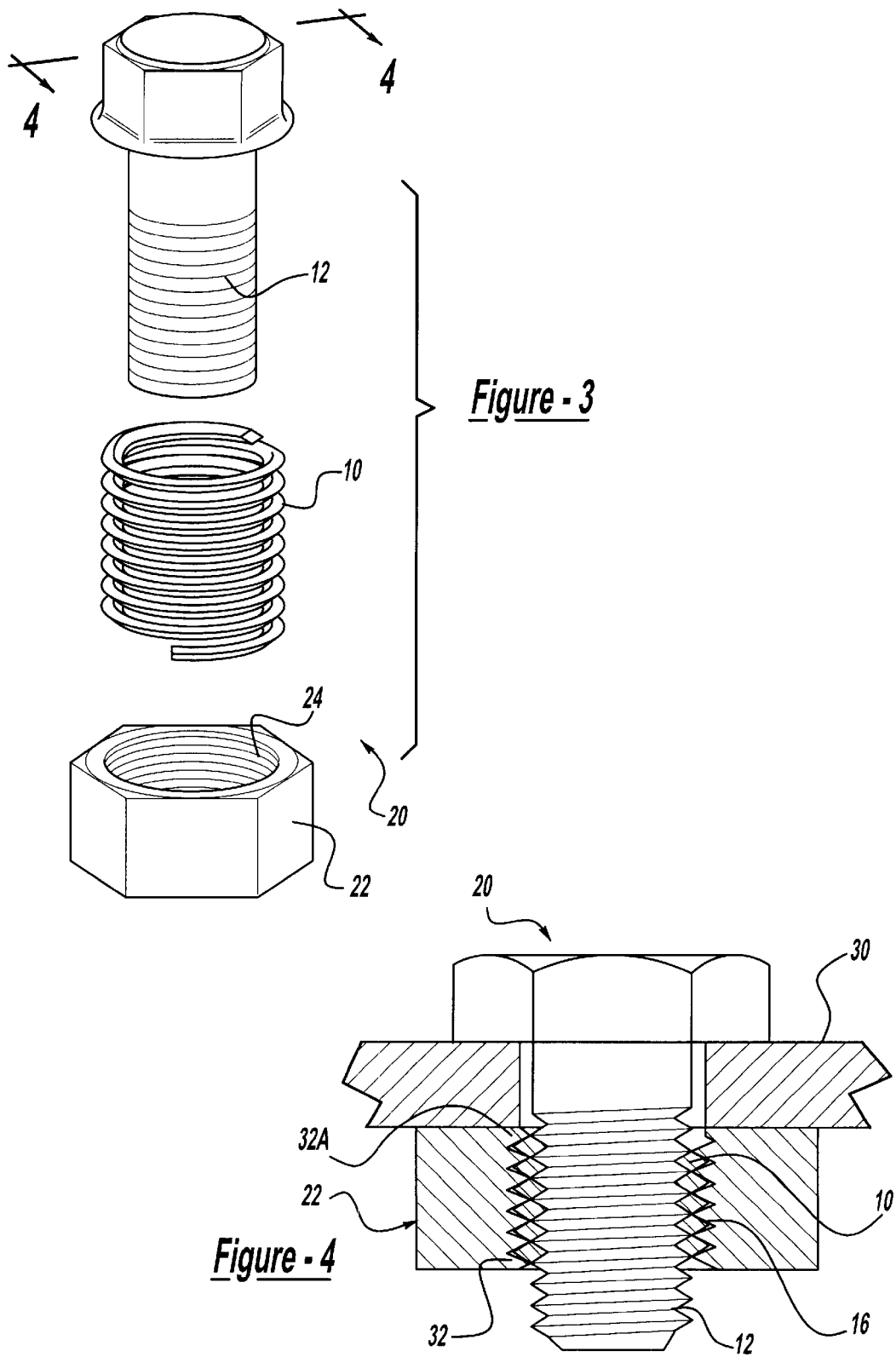

ANTI-GALLING FASTENER INSERTS

BACKGROUND OF THE INVENTION

The present invention relates to fastener inserts and, more particularly, to anti-galling inserts formed from a hardened stainless steel metal alloy which are useful in both substrates and nut assemblies.

Fastener assemblies come in a variety of shapes, sizes, designs and materials. Many fastening assemblies include not only a fastener such as a bolt, pin or screw, but also will include a fastener insert to be positioned within a tapped hole. One specific type of fastener insert useful in association with a threaded fastener is the helically coiled wire insert as described in U.S. Pat. No. 2,672,070 entitled "Wire Coil Screw Thread Insert for Molded Material", for example.

Generally speaking, tapped threads are strengthened due to the inherent flexibility of such helically coiled wire inserts since the insert provides a more balanced distribution of dynamic and static loads throughout the length of thread engagement. This flexibility also compensates for variation in lead and angle error.

Additionally, since the helically coiled insert does not exhibit staking, locking or swaging and does not require keying in place, helically coiled wire inserts greatly reduce stress which would otherwise be transferred to the receiving substrate. While such helically coiled wire inserts are generally useful as anchoring mechanisms for threaded fasteners in order to be used in high strength applications, such inserts must be formed from high strength materials. Heretofore, 302/304 stainless steels have been used to manufacture fastener inserts.

Due to the intimate connection between the threads of the fastener and the insert, shearing forces are exerted on the fastener insert upon attachment of the fastener. As a result of the shearing forces, fastener inserts formed from 302/304 type stainless steels have exhibited a propensity to galling despite such stainless steels being considered among the hardest in the industry.

Although galling and wear may occur under similar conditions, the types of deterioration involved are not similar. Galling occurs as a result of movements occurring along a metal-to-metal contact in a localized area which results in grooving and self-welding of the metals at the localized areas. This, in turn, leads to seizure of the metal parts.

On the other hand, wear is synonymous with abrasion and can result from metal-to-metal contact or metal-to-nonmetal contact. Such wear is characterized by relatively uniform loss of metal from the surface, as contrasted to localized grooving with consequent metal build-up, as a result of rubbing a much harder metallic surface against a softer metallic surface.

An article by Harry Tanczyn, entitled "Stainless Steel Galling Characteristics Checked" in STEEL, Apr. 20, 1954 points out that stainless steel sections at a relatively high hardness level or with a substantial difference in hardness, exhibit better resistance to galling than the combination of two soft members. This may be explained by the theory that the hardened sections deform elastically near the contact points under loading, while the softer pieces yield plastically for a significant distance beneath the contact points. During movement, the hardened surfaces apparently recover elastically with decrease in pressure, and this motion tends to sever any metallic welding.

Among the numerous prior art steels currently available, the austenitic Type 304 is suited to a variety of uses involving welding and fabrication, but the galling and wear resistance of this steel are poor and the metal is likely to fail when subjected to such conditions.

In view of the perceived problems with galling, the art has recently turned to cobalt bearing and high nickel alloys which are known to fight wear and galling.

SUMMARY OF THE INVENTION

It is therefore a primary object of the present invention to provide stainless steel fastener inserts which tend to limit, if not eliminate, galling in fastener assemblies.

To accomplish this objective, among others, the present invention relates to an anti-galling fastener insert comprising a body formed from a nitrogen strengthened stainless steel alloy. The stainless steel alloy preferably will include a positive amount up to a total of about 0.8% nitrogen. More particularly, the present invention relates to a nitrogen strengthened stainless steel insert formed from an alloy comprising: a) from about 0.05 to 0.15% carbon; b) from about 5.0 to 12.0% manganese; c) from about 2.0 to 6.0% silicon; d) from about 12.0 to 20.0% chromium; e) from about 6.0 to 12.0% nickel; f) from about 0.02 to 0.8% nitrogen; with the remainder being iron.

Still more preferably, the fastener insert is formed from a nitrogen strengthened stainless steel alloy comprising a) from about 0.07 to 0.12% carbon; b) from about 7.0 to 10.0% manganese; c) from about 3.0 to 5.0% silicon; d) from about 14.0 to 18.0% chromium; e) from about 7.0 to 10.0% nickel; f) from about 0.06 to 0.3% nitrogen; with the remainder being iron.

According to a highly preferred embodiment, the fastener insert will be formed from a nitrogen strengthened austenitic stainless steel alloy comprising: a) from about 0.08 to 0.1% carbon; b) from about 7.0 to 9.0% manganese; c) from about 3.5 to 4.5% silicon; d) from about 16.0 to 18.0% chromium; e) from about 8.0 to 9.0% nickel; f) from about 0.08 to 0.18% nitrogen; with the remainder being iron.

After forming the alloy into a round wire and allowing the wire to cool to room temperature, the wire is shaped to a diamond cross section and subsequently formed into insert. The resulting fastener inserts should have excellent anti-galling characteristics at both ambient and elevated temperatures. Further, the fastener inserts should have good corrosion resistance and a room temperature yield strength which surprisingly is almost twice that of fastener inserts formed from 304 type stainless steel. The nitrogen strengthened stainless steel fastener inserts of the present invention also provide excellent oxidation resistance and excellent impact strength, particularly at sub-zero temperatures.

The present invention also relates to an anti-galling free running nut assembly. The nut assembly includes a nut having an internal screw thread barrel and a helically coiled fastener insert formed from an alloy comprising: a) from about 0.05 to 0.15% carbon; b) from about 5.0 to 12.0% manganese; c) from about 2.0 to 6.0% silicon; d) from about 12.0 to 20.0% chromium; e) from about 6.0 to 12.0% nickel; f) from about 0.02 to 0.8% nitrogen; with the remainder being iron.

DETAILED DESCRIPTION OF THE DRAWINGS

FIG. 1 is a blown apart perspective view of a fastener assembly including a helically wound insert;

FIG. 2 is an assembly view in cross-section of the fastener assembly of FIG. 1;

FIG. 3 is a blown apart perspective view of a nut assembly including a helically wound insert;

FIG. 4 is an assembly view in cross-section of the nut assembly of FIG. 3; and

The alloys employed to form the anti-galling fastener inserts of the present invention have been analyzed using a "button and block" galling test to rank various stainless steel alloys for their galling tendencies. According to the procedure, a dead load weight was applied in a Brinell Hardness Tester on two flat, polished surfaces (10–20 microinches). Buttons having a 0.5 inch diameter were slowly rotated by hand 360° under the load and then examined for galling at a 7x magnification. If no galling was apparent, new specimens were tested at higher stresses until galling was observed. The "threshold" galling stress was selected as the stress midway between the highest non-galled stress and the stress where galling was first observed. As illustrated in Table 1 below, the alloys of the present invention had values of greater than 50, thereby significantly outperforming all other stainless steel alloys tested for galling characteristics.

TABLE 1

| Conditions & Nominal Hardness (Brinell) | Type 410 | Type 416 | Type 430 | Type 440C | Type 303 | Type 304 | Type 316 | Alloy of Present Invention |
|---|---|---|---|---|---|---|---|---|
| Type 410 | 3 | 4 | 3 | 3 | 4 | 2 | 2 | 50+ |
| Type 416 | 4 | 13 | 3 | 21 | 9 | 24 | 42 | 50 |
| Type 430 | 3 | 3 | 2 | 2 | 2 | 2 | 2 | 36 |
| Type 440C | 3 | 21 | 2 | 11 | 5 | 3 | 37 | 50+ |
| Type 303 | 4 | 9 | 2 | 5 | 2 | 2 | 3 | 50+ |
| Type 304 | 2 | 24 | 2 | 3 | 2 | 2 | 2 | 50+ |
| Type 316 | 2 | 42 | 2 | 37 | 3 | 2 | 2 | 38 |
| Alloy of Present Invention | 50+ | 50+ | 36 | 50+ | 50+ | 50+ | 38 | 50+ |

DETAILED DESCRIPTION OF THE INVENTION

Referring to FIGS. 1–2, there is shown an anti-galling fastener insert 10 formed from a nitrogen strengthened stainless steel alloy in accordance with the teachings of the present invention. The fastener insert, which may be of a variety of shapes and sizes, is shown to be in the form of a helically coiled wire to be used in association with a threaded fastener 12. As shown, the insert is positioned within a threaded aperture 16 provided along a substrate 14 to secure an object 30 in combination with the fastener.

To form the fastener insert 10, an alloy comprising a) from about 0.05 to 0.15% carbon; b) from about 5.0 to 12.0% manganese; c) from about 2.0 to 6.0% silicon; d) from about 12.0 to 20.0% chromium; e) from about 6.0 to 12.0% nickel; f) from about 0.02 to 0.8% nitrogen; with the remainder being iron.

Preferably, the fastener inserts 10 are manufactured such that they are larger in diameter, before installation, than the tapped holes within which they are employed to ensure that they become firmly secured. For helically wound fastener inserts, it is preferable that the coils have about a 60° internal screw thread convolution which can accommodate virtually any standard threaded bolt or screw. By the phrase "internal screw thread convolution", it is meant that when the helically coiled insert is installed into a properly prepared tapped hole, the diamond shaped wire (60° cross section) will conform to the internal threads of the tapped hole and create another internal thread form (of a smaller pitch diameter) which will allow the acceptance of any standard 60° screw thread male fastener of corresponding size. Additionally, the fastener inserts may include removable or break away tangs 28 which are useful during the insertion process.

Fastener inserts manufactured using the alloys of the present invention as well as inserts formed from Type 304 stainless steels were installed into aluminum blocks provided with #10–32 size bores to fastener bores for analysis.

To analyze for resistance to friction forces, a comparison was made between "standard tapped hole assemblies" and assemblies incorporating the fastener inserts of the present invention. The so-called standard tapped holes included preparing Type 316 stainless steel test blocks with #10–32 size threaded bores which were electropolished and introducing both plain and chemically polished Type 316 stainless steel screws which were cleaned to electronic industry standards. While Type 304 stainless steel inserts were originally used in the standard tapped hole assemblies, the torque required for rotation of the screws varied so drastically from one sample to the next that no quantitative data could be compiled. As such, the analysis on the standard tapped hole assemblies were carried out without fastener inserts.

The fastener assemblies of the present invention included aluminum test blocks with #10–32 size threaded bores and fastener inserts formed from the above described alloys. Again, both plain and chemically polished Type 316 stainless steel screws were used to measure the friction forces. Torque tests were conducted with test blocks perfectly aligned as well as misaligned by 2 and 4 degrees from perpendicular. The torque was recorded for twenty screws under each assembly with ten insertions for each screw.

As should be understood by those skilled in the art, friction between a screw and a tapped hole can diminish the pre-load on the screw by absorbing some of the rotational torque during installation. In extreme instances, the friction during rotation can lead to galling and self-welding, thus, resulting in seizure of the fastener.

The torque required to rotate the stainless steel screws in the standard tapped holes increased from the first to the tenth insertion and increased dramatically with an increase in the angle of misalignment. The calculated installation torque increased by as much as 77%.

The torque required for rotation of the same stainless steel screws within the fastener assemblies of the present invention were between 17% to 44% lower than the comparable standard tapped holes. Additionally the friction forces generated with an increase in the misalignment angle were significantly lower than the standard tapped holes. Perhaps most importantly, the required torque values for the fastener assemblies employing the inserts of the present invention were substantially uniform as compared to the standard. As such, the holding power of the screws from one application to the next should be relatively consistent.

Referring to FIGS. 3 and 4, a nut assembly 20 incorporating an anti-galling fastener insert 10 is shown. The nut assembly may be free running or a locking assembly. By free running, it is meant that the anti-galling insert disposed within the nut barrel has substantially symmetrical helical coil over its entire length, whereas a locking nut includes an insert having at least one unsymmetrical combination, usually including straight segments. The nut assembly includes a nut 22 and an anti-galling fastener insert 10. The nut 22, which may be made on a conventional nut making machine, includes a barrel 24 of generally constant pitch and diameter throughout. Upon installing the insert 10 within the nut barrel 24, the internal threads of the nut may be deformed at each end 32 and 32A, respectively, to prevent the insert from 20 becoming disengaged from the nut.

Upon forming the nut assembly 20, a fastener such as a threaded bolt or a stud can be inserted into the nut including the fastener insert to retain an object 30. The nut assembly not only is resistant to galling as defined above, but also provides a more uniform torque and more accurate preload or clamp up.

While it will be apparent that the preferred embodiments of the invention disclosed are well calculated to fulfill the objects stated, it will be appreciated that the invention is susceptible to modification, variation and change without departing from the spirit thereof.

What is claimed is:

1. A fastener insert formed from a nitrogen strengthened stainless steel alloy for insertion into a tapped hole, comprising:

a) from about 0.05 to 0.15% carbon;

b) from about 5.0 to 12.0% manganese;

c) from about 2.0 to 6.0% silicon;

d) from about 12.0 to 20.0% chromium;

e) from about 6.0 to 12.0% nickel;

f) from about 0.02 to 0.8% nitrogen;

with the remainder being iron, wherein said insert exhibits improved yield strength when inserted into said tapped hole.

2. The fastener insert of claim 1 wherein said insert is in the form of a helically coiled wire.

3. The fastener insert of claim 2 wherein said helically coiled wire has about a 60° internal screw thread convolution.

4. The fastener insert of claim 1 wherein said helically coiled wire includes a selectively removable tang.

5. A helically coiled screw thread insert disposable within a tapped hole or nut for receiving a threaded fastener, said insert being formed from an alloy comprising:

a) from about 0.05 to 0.15% carbon, b) from about 5.0 to 12.0% manganese; c) from about 2.0 to 6.0% silicon; d) from about 12.0 to 20.0% chromium; e) from about 6.0 to 12.0% nickel; f) from about 0.02 to 0.8% nitrogen; with the remainder being iron, said insert exhibiting improved yield strength when inserted into said tapped hole or nut.

6. The fastener insert of claim 5 wherein said helically coiled wire has about 60° internal screw thread convolution.

7. The fastener insert of claim 5 wherein said helically coiled wire includes a selectively removable tang.

8. A helically coiled screw thread insert disposable within a tapped hole or nut for receiving a threaded fastener, said insert being formed from an alloy comprising:

a) from about 0.08 to 0.1% carbon; b) from about 7.0 to 9.0% manganese; c) from about 3.5 to 4.5% silicon; d) from about 16.0 to 18.0% chromium; e) from about 8.0 to 9.0% nickel; f) from about 0.08 to 0.18% nitrogen; with the remainder being iron, said insert exhibiting improved yield strength when inserted into said tapped hole or nut.

9. The fastener insert of claim 8 wherein said helically coiled wire has a bout a 60° internal screw thread convolution.

10. The fastener insert of claim 8 wherein said helically coiled wire includes a selectively removable tang.

* * * * *

UNITED STATES PATENT AND TRADEMARK OFFICE
CERTIFICATE OF CORRECTION

| | | |
|---|---|---|
| PATENT NO. | : 6,494,659 B1 | |
| APPLICATION NO. | : 09/498821 | |
| DATED | : December 17, 2002 | |
| INVENTOR(S) | : William J. Lutkus et al. | |

It is certified that error appears in the above-identified patent and that said Letters Patent is hereby corrected as shown below:

Drawings,
Please substitute Sheet 2 of 2 (showing FIGURE 3, FIGURE 4 and FIGURE 5) for published Sheet 2 of 2, as attached.

Column 6,
Lines 29 and 43, "a bout" should be -- about --.

Signed and Sealed this

Eleventh Day of September, 2007

JON W. DUDAS
*Director of the United States Patent and Trademark Office*

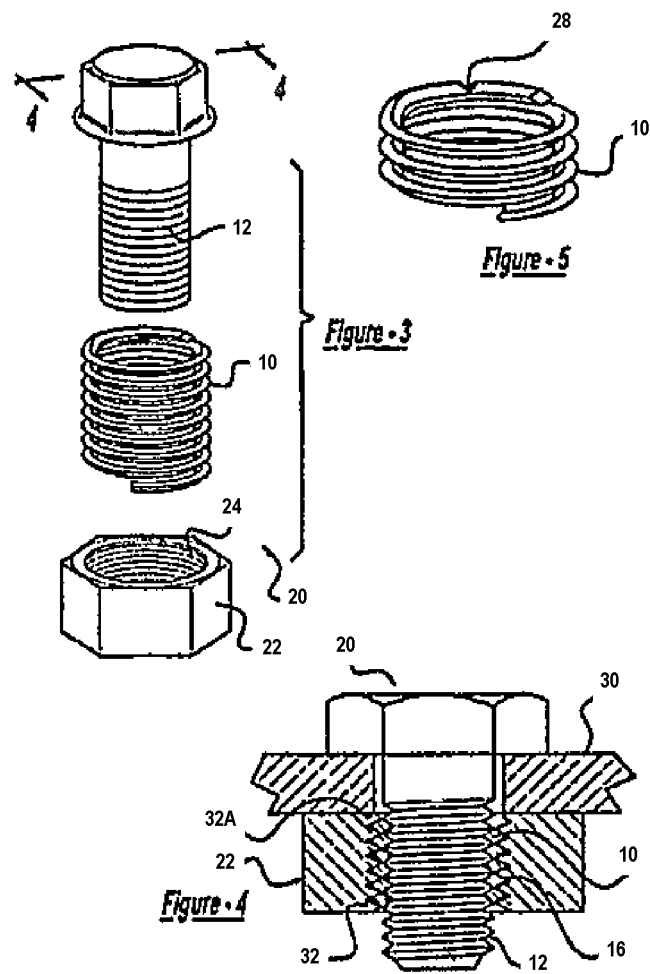

(12) EX PARTE REEXAMINATION CERTIFICATE (7325th)
United States Patent
Lutkus et al.

(10) Number: US 6,494,659 C1
(45) Certificate Issued: Jan. 19, 2010

(54) ANTI-GALLING FASTENER INSERTS

(75) Inventors: William J. Lutkus, Watertown, CT (US); William Giannakakos, Danbury, CT (US); Ronald J. Phillips, Simsbury, CT (US)

(73) Assignee: Newfrey LLC, Newark, DE (US)

Reexamination Request:
No. 90/007,492, Apr. 1, 2005

Reexamination Certificate for:
Patent No.: 6,494,659
Issued: Dec. 17, 2002
Appl. No.: 09/498,821
Filed: Feb. 4, 2000

Certificate of Correction issued Sep. 11, 2007.

(51) Int. Cl.
*F16B 37/12* (2006.01)

(52) U.S. Cl. .................................................. 411/438
(58) Field of Classification Search .................. None
See application file for complete search history.

(56) References Cited

U.S. PATENT DOCUMENTS

| | | | | |
|---|---|---|---|---|
| 2,607,259 A | * | 8/1952 | Forster | 411/438 |
| 3,912,503 A | * | 10/1975 | Schumacher et al. | 420/42 |
| 3,940,266 A | | 2/1976 | Goller et al. | |
| 3,989,474 A | | 11/1976 | Goller et al. | |

OTHER PUBLICATIONS

Standard Handbook of Fastening and Joining, Robert O. Parmley, P.E.□□Section 1, Threaded Fasteners—Descriptions and Standards, pp. 1–1 to 1–4□□Copyright 1997 by McGraw–Hill, Inc. ISBN 0-07-048511-9.*

Armco Product Data Bulletin, Armco Nitronic 60 Stainless Steel Bar and Wire, pp. 1–33, copyright 1990.

Armco Product Data Bulletin No. S–45, Armco Nitronic 60 Stainless Steel, pp. 1–32, publication date unknown.

* cited by examiner

*Primary Examiner*—Aaron J. Lewis

(57) ABSTRACT

Described herein is a nitrogen strengthened stainless steel fastener insert and nut assembly which is resistant to galling when used in a fastener assembly. In addition to reduced galling, the fastener insert exhibits good corrosion resistance and a yield strength which is almost twice that of fasteners formed from 304 type stainless steel.

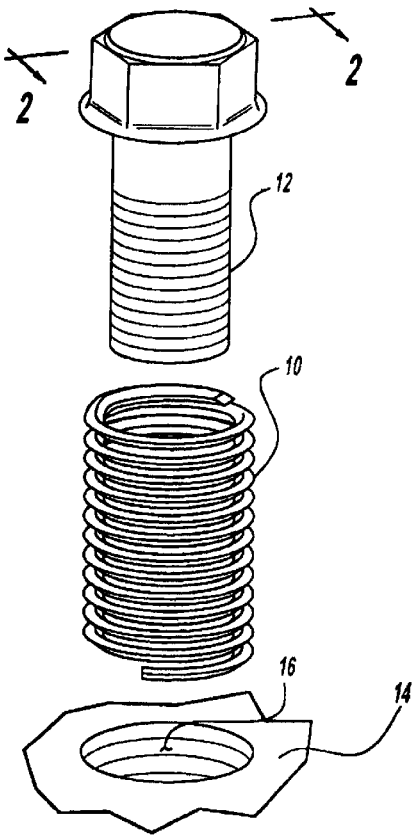

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–10 are cancelled.

\* \* \* \* \*